United States Patent
Guillemette (10) Patent No.: US 9,210,020 B1
(45) Date of Patent: Dec. 8, 2015

(54) SYSTEM AND METHOD FOR SUPPRESSING PAPR IN MC-CDMA AND DERIVATIVES

(71) Applicant: Huawei Technologies Co., Ltd., Shenzhen (CN)

(72) Inventor: Philippe A. J. Guillemette, Stittsville (CA)

(73) Assignee: Huawei Technologies Co., Inc., Shenzhen (CN)

( * ) Notice: Subject to any disclaimer, the term of this patent is extended or adjusted under 35 U.S.C. 154(b) by 0 days.

(21) Appl. No.: 14/322,609

(22) Filed: Jul. 2, 2014

(51) Int. Cl.
*H04L 27/34* (2006.01)
*H04L 27/26* (2006.01)

(52) U.S. Cl.
CPC .......... *H04L 27/2621* (2013.01); *H04L 27/265* (2013.01); *H04L 27/2628* (2013.01)

(58) Field of Classification Search
CPC ............................ H04L 27/34; H04L 27/3854
USPC .................................................. 375/308, 329
See application file for complete search history.

(56) References Cited

U.S. PATENT DOCUMENTS

| | | | |
|---|---|---|---|
| 2003/0147655 A1* | 8/2003 | Shattil | 398/182 |
| 2004/0008616 A1* | 1/2004 | Jung et al. | 370/203 |
| 2009/0080500 A1* | 3/2009 | Muharemovic et al. | 375/146 |

\* cited by examiner

*Primary Examiner* — Michael Neff
(74) *Attorney, Agent, or Firm* — Slater & Matsil, L.L.P.

(57) ABSTRACT

Embodiments are provided to suppress the peak-to-average power ratio (PAPR) in MC-Multi-Carrier Code Division Multiple Access (MC-CDMA) and derivative systems. The embodiments include transmitter and receiver configurations for limiting the level of PAPR in the transmitted and received signals. The PAPR is limited to a PAPR of typical OFDM signals. At the transmitter, a sequence of Newman phase rotations (rotors) is applied to a sequence of transmitted signals prior to an inverse Fast Fourier Transform (FFT) function. With the correct choice of Newman phases, the PAPR of the transmitted signals is sufficiently suppressed. The sequence is also repeated for subsequently transmitted signals. At the receiver, the sequence of Newman rotors is removed after a FFT function. The transmitter and receiver are configured by adding an additional module or function without changing other existing used modules or functions.

30 Claims, 4 Drawing Sheets

SYSTEM AND METHOD FOR SUPPRESSING PAPR IN MC-CDMA AND DERIVATIVES

TECHNICAL FIELD

The present invention relates to the field of wireless communications, and, in particular embodiments, to a system and method for suppressing peak-to-average power ration (PAPR) in Multi-Carrier Division Multiple Access (MC-CDMA) and derivatives.

BACKGROUND

Multi-Carrier Code Division Multiple Access (MC-CDMA) is a modulation method that uses multi-carrier or orthogonal frequency-division multiplexing (OFDM) transmission of Discrete Sequence CDMA (DS-CDMA) type signals. MC-CDMA is developed to improve performance (e.g., in terms of spectral efficiency) over multipath links. A fully loaded MC-CDMA system, where the number of users equals the spreading factor, can operate in a highly time dispersive channel with satisfactory bit error rate, e.g., in contrast to a fully loaded DS-CDMA link. MC-CDMA derivatives, such as Low Density Signature OFDM (LDS-OFDM), have a similar scheme of spreading symbols within a multi-carrier transmission. Some of these derivatives, such as LDS-OFDM, also allow overloading, where the number of users spread across the same frequencies can exceed the spreading factor. However, MC-CDMA and derivatives schemes can suffer from high peak-to-average power ratio (PAPR). A signal may exhibit a high PAPR because independent phases of the sub-carriers can often combine constructively. Handling this high PAPR requires using linear transmitter circuitry that suffers from poor power efficiency. There is a need for a scheme that restricts or suppresses high PAPR in such systems.

SUMMARY OF THE INVENTION

In accordance with an embodiment, a method by a transmitter for suppressing peak-to-average-power ratio (PAPR) in Multi-Carrier Code Division Multiple Access (MC-CDMA) and derivative systems includes adding, to a sequence of signals, a corresponding sequence of Newman phase offsets. A corresponding phase offset of the Newman phase offsets is added to each of the signals. After adding the sequence of Newman phase offsets to the sequence of signals, an inverse Fourier transform is applied to the sequence of signals. The sequence of signals is then transmitted, including the sequence of Newman phase offsets.

In accordance with another embodiment, a transmitter configured for suppressing PAPR in MC-CDMA and derivative systems includes at least one processor and a non-transitory computer readable storage medium storing programming for execution by the at least one processor. The programming includes instructions to add, to a sequence of symbols, a corresponding sequence of Newman phase offsets, wherein each of the symbols is added a corresponding phase offset of the Newman phase offsets. The transmitter is further configured to apply an inverse Fourier transform to the sequence of symbols, after adding the sequence of Newman phase offsets to the sequence of symbols. The transmitter then transmits the sequence of symbols including the sequence of Newman phase offsets.

In accordance with another embodiment, a method by a receiver for receiving signals with suppressed PAPR in MC-CDMA and derivative systems includes receiving, from a communication device, a sequence of signals comprising a corresponding sequence of Newman phase offsets. The method further includes applying a Fourier transform to the sequence of signals, and removing the sequence of Newman phase offsets from the sequence of signals.

In accordance with yet another embodiment, a receiver configured for receiving signals with suppressed PAPR in MC-CDMA and derivative systems includes at least one processor and a non-transitory computer readable storage medium storing programming for execution by the at least one processor. The programming configures the receiver to apply a Fourier transform to a sequence of symbols comprising a corresponding sequence of Newman phase offsets, wherein the sequence of symbols is received from a communication device, and remove the sequence of Newman phase offsets from the sequence of symbols.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In order to make MC-CDMA and derivative technologies, such as LDS-OFDM, viable candidates, e.g., for uplink access, in demanding or advanced systems, such as for fifth generation (5G) wireless communications, there is a need for reducing the PAPR in the system's signals. Embodiments are provided herein to reduce or suppress the PAPR in such systems without substantially increasing overhead, complexity, and/or cost. The embodiments include transmitter and receiver configurations (e.g., for MC-CDMA, LDS-OFDM, or similar signals) for limiting or restricting the level of PAPR in the transmitted and received signals. The PAPR of MC-CDMA and derivatives signals can be limited to a PAPR of typical OFDM signals, e.g., an average PAPR of an OFDM signal having an equivalent number of subcarriers, without reducing system performance. At the transmitter, a sequence of phase rotations (a sequence of Newman rotors) is applied to a sequence of transmitted signals prior to an inverse Fast Fourier Transform (FFT) function or any suitable type or algorithm of inverse Fourier transforms. With the correct choice of Newman phases, the PAPR of the transmitted signals can be well or sufficiently suppressed. The sequence is also repeated for subsequently transmitted signals. At the receiver, the sequence of Newman rotors is removed after a FFT function or any suitable type or algorithm of Fourier transforms. The transmitter and receiver may be configured without complex modification of current design, e.g., by adding an additional module or function without changing other existing or currently used modules or functions.

The schemes herein are applicable to downlink and uplink signals, e.g., regardless of antenna configuration. Further, a solution can be presented in an embodiment that is blind, meaning that it does not require additional signaling between the transmitter and receiver and is independent of spreading code or sequence. As such, the schemes avoid wasting signaling resources. The schemes also avoid wasting energy by removing the need for excessive back off in the transmitter's power amplifier (PA). Reducing the power requirement at the transmitter can also increase battery lifetime (e.g., at a user equipment (UE)).

Figure 1:
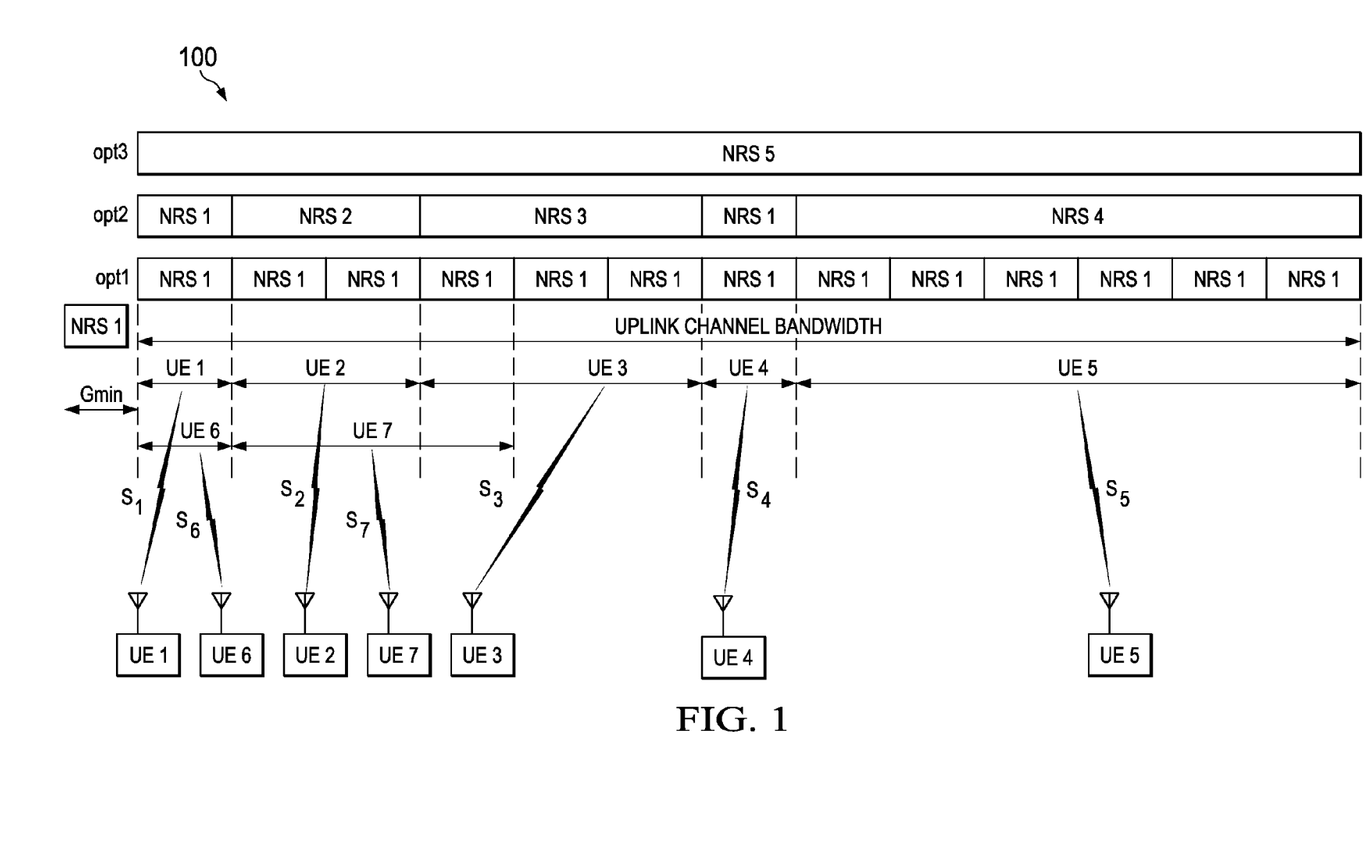
FIG. 1 illustrates an embodiment of a MC-CDMA transmission scheme with suppressed PAPR.

FIG. 1 illustrates an embodiment of a MC-CDMA transmission scheme 100 with suppressed PAPR. The scheme shows a plurality of UEs (UE1, UE2, UE3, UE4, UE4, UE5, UE6, and UE7) transmitting on uplink to a base station (e.g., eNB) using corresponding assigned or allocated bandwidth. This allows the UEs to transmit simultaneously to the base station or network. Three alternative options (opt1, opt2, and opt3) for PAPR suppression may be used. In a first option (opt1), each bandwidth for a UE is allocated an integer number, M, of minimum grant bandwidth (Gmin). For example, the bandwidth of UE1 and similarly UE4 and UE6 is equal to one Gmin (M=1), the bandwidth of UE2 is divided into 2 Gmins (M=2), the bandwidth of UE3 and similarly UE7 is divided into 3 Gmins (M=3), and the bandwidth of UE5 is divided into five Gmins (M=5). Each Gmin represents a sequence of phase rotations, specifically a Newman rotor sequence (NRS1), which is added to a corresponding sequence of signals or symbols ($s_1, s_2, s_3, s_4, s_5, s_6$, and $s_7$) for transmission, as described in more detail below. This option allows overlap in bandwidth between different UEs, such as the overlap of UE7's bandwidth with both UE2 and UE3, as shown in FIG. 1. The Newman rotor sequence is stored or generated at both the transmitter and receiver. The NRS1 has the same length as Gmin and is repeated by the corresponding integer multiple of Gmins, M, in each UE assigned bandwidth. The edge of the allocated bandwidth is aligned with the edge of the NRS1 to simplify synchronization in the receiver to remove the phase offsets. For example, UE1, UE4, and UE6 each uses one NRS1 to transmit over its bandwidth, UE2 uses two repeated NRS1s to transmit over its bandwidth, UE3 and UE7 each uses three repeated NRS1s to transmit over its bandwidth, and UE5 uses five repeated NRS1s to transmit over its bandwidth. The signals or symbols, $s_1, s_2, S_3, s_4, s_5, s_6$ and $s_7$, may be transmitted simultaneously from the corresponding UEs to the base station. Option 1 above permits UEs to transmit at the same time and on the same frequency, such as the case of UE1 and UE6 as well as the case of UE7 where its signal superposes on those of UE2 and UE3. In both of these cases, because the NRS1 is aligned with the allocation bandwidths and is equal to Gmin, the phase rotations are simple to remove in the receiver.

In a second option (opt2), a UE is assigned a different Newman rotor sequence that has the same length of the UE's corresponding bandwidth. For example, UE1 and UE4 each uses one NRS1 equal in length to UE1's and UE4's bandwidth (equal to the length of one Gmin). UE2 uses one NRS2 equal in length to UE2's bandwidth (equal to twice the length of Gmin). UE3 uses one NRS3 equal in length to UE3's bandwidth (equal to three multiples of Gmin). UE5 uses one NRS4 equal in length to UE5's bandwidth (equal to five multiples of Gmin). The first and second options may also be used for downlink transmission from the network or base station to the UEs.

In a third option (opt3), a single sequence, NRS5, may be used by multiple UEs. The NRS5 has a length equal to the sum of bandwidths of all the UEs. This option may be more suitable for downlink transmission from the base station to the UEs. Further, in other embodiments, a Newman rotor sequence with a fraction length (e.g., an integer fraction) of Gmin can be used and is repeated in each UE assigned bandwidth and can be treated similarly to option 1. The size of the Newman rotor sequence can be selected such that the bandwidth assigned per UE comprises an integer multiple of the Newman rotor sequence.

Figure 2:
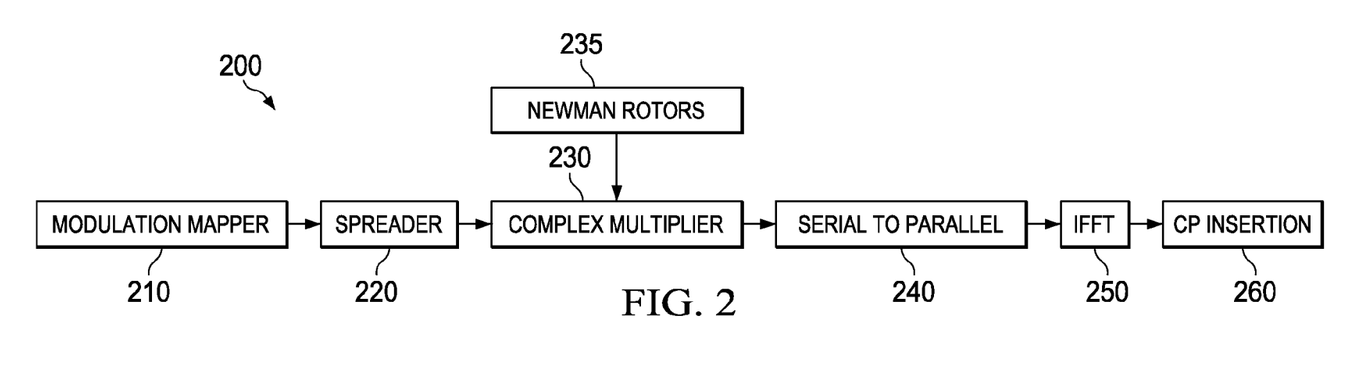
FIG. 2 illustrates an embodiment transmitter that limits or suppresses PAPR for MC-CDMA and derivative systems.

FIG. 2 illustrates an embodiment of a transmitter 200 that limits or suppresses PAPR for MC-CDMA and derivative systems. For instance, in the case of uplink signals, the transmitter 200 is located at a user device, a UE, or at another terminal device. The transmitter can also be part of a network infrastructure, such as a base station communicating with a UE, or any other suitable wireless communication devices. The transmitter 200 comprises a plurality of functional blocks for signal processing, which may be implemented via software, hardware, or both. The functional blocks include a modulation mapper 210 configured to properly modulate the signals for transmission, a spreader 220 that spreads the signal symbols according to the MC-CDMA or a derivative scheme, a serial-to-parallel converter 240 that arranges multiple signals or symbols into a parallel format for transmission (e.g., in frequency domain), an inverse FFT (IFFT) function 250 that processes the signals for inverse FFT inversion (from frequency to time domain), and a cyclic prefix (CP) insertion function 260 for inserting CP to the signals before transmission. The functional blocks may be arranged in the order shown in FIG. 2 or in any suitable order that achieves the same purpose (produces the same final transmitted signals).

Additionally, the functional blocks include a complex multiplier function 230 positioned between the spreader 220 and the serial-to-parallel converter 240, and a Newman rotors function 235 coupled to the complex multiplier function 230. The transmitter 200 is configured to apply a set of phase rotations to the transmitted signals prior to the IFFT function 250 to ensure that the resulting PAPR in the signals is not worse than that the PAPR for OFDM signals. The total assigned bandwidth for a UE can be split into integer multiples of equal length, each referred to as a resource element (RE). A RE is the smallest unit of transmission resource, e.g., in both uplink and downlink. For instance, an RE may consist of 1 subcarrier in the frequency domain for a duration of one OFDM symbol in the time domain. For each RE, the complex multiplier function 230 adds the phase rotations or offsets to the signals from the spreader 220 and sends the resulting signals to the serial-to-parallel converter 240. A repeating set of phase offsets is applied, as described below, to the frequency spread signals prior to applying the IFFT. The phase rotations are applied to each RE via complex multiplication.

The phase rotations are Newman rotor sequences generated by the Newman rotors function 235. First, a sequence of Newman phases is obtained as a function of an integer N, such as in the form of phases=(pi*(0:N−1).^2/N). Next, using the sequence of Neman phases, a Newman rotor sequence is obtain, such as rotors=exp(phases*1j), where 1j=sqrt(−1). It is also valid to spin the rotors in the reverse direction by including a negative in the phases. N may be any suitable integer that determines the length of a minimum Grant bandwidth (Gmin). For instance, the Gmin may be set to an integer number of REs. In an embodiment, a same constant phase offset is added to each of the Newman phases in the sequence, such as in the form phases=(pi*(0:N−1).^2/N)+constant phase term.

The integer N may be selected according to different conditions to achieve the desired PAPR limit, e.g., to achieve a typical OFDM PAPR. For instance, the number of REs, M, that form the assigned bandwidth for a UE is one factor considered to determine N. For single spreading sequences/codebooks, the greatest decrease in PAPR occurs for smaller bandwidths, e.g., for smaller numbers of REs in the bandwidth allocated for the UE. As the number of REs increases, the PAPR curves in the signals with added sequences of Newman rotors tend towards the PAPR curve of a composite signal which is also bound by the OFDM PAPR curve. For example, in one implementation, the minimum Grant bandwidth (Gmin) is determined by setting M to 36 REs, which is suitable for LTE uplinks, and the Newman rotor sequence length, N, is set to 18. However, other values may also work well. Adding the phase offsets or Newman rotors to the signals is found to reduce the PAPR in the transmitted signal. The system can be configured such that the PAPR reaches, e.g., at a worse case, a level about equal to the typical OFDM PAPR. This makes the signals suitable for more demanding systems, such as LDS-OFDM or 5G wireless communications.

Figure 3:
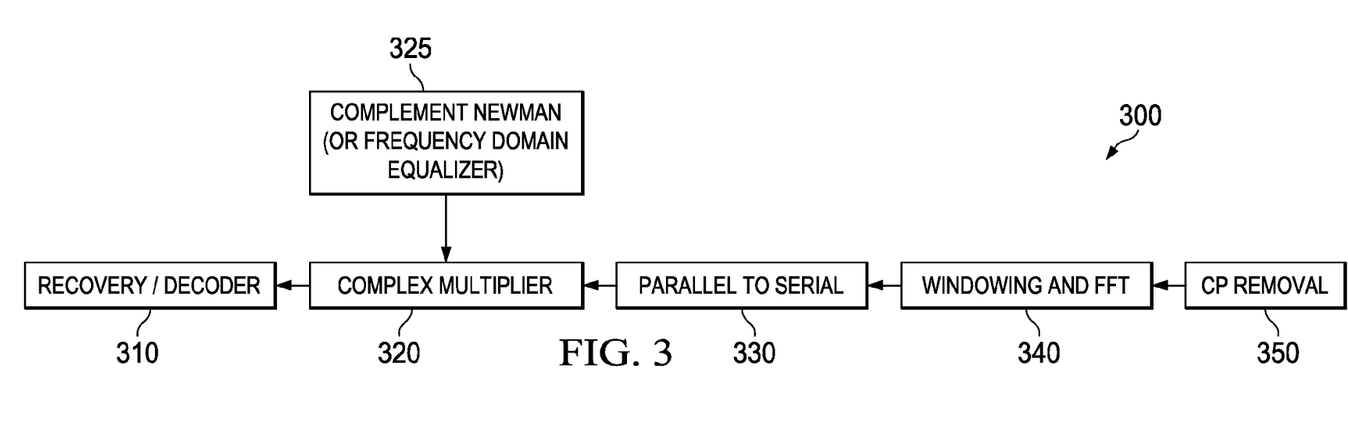
FIG. 3 illustrates an embodiment receiver for receiving signals with limited or suppressed PAPR for MC-CDMA and derivative systems.

FIG. 3 illustrates an embodiment of a receiver 300 for receiving signals with limited or suppressed PAPR. The receiver 300 is used in conjunction or in communication with the transmitter 200. For instance, in the case of uplink signals, the receiver 300 is located at a base station or eNode B (eNB) that communicates with a UE. The receiver 300 comprises a plurality of functional blocks for signal processing, which may be implemented via software, hardware, or both. At least some of the function blocks of the receiver 300 implement inverse functions with respect to the blocks in the transmitter 200. The blocks of the receiver 300 include a CP remover 350 that removes the CP inserted in the signals, a windowing and FFT function 340 that applies a FFT to the received signals within an appropriate band, a parallel-to-serial converter 330 that inverts the operation of the serial-to-parallel converter 240, and a recovery/decoder function 310 that retrieves the original signals from the modulated signals. The functional blocks may be arranged in the order shown in FIG. 3 or in any suitable order that achieves the same purpose (produces the same original signals).

Additionally, the functional blocks include a complex multiplier function 320 that is positioned between the parallel-to-serial converter 330 and the recovery/decoder function 310, and a complement Newman block 325 coupled to complex multiplier function 320. The receiver 300 is configured to remove, following the FFT of the received signal, the phase rotations or offsets that were introduced to the signal at the transmitter 200. The complement Newman block 325 generates complement rotations with respect to the Newman rotors function 235 (complement Newman rotors) and the complex multiplier function 320 applies the complement rotors to the received signals or symbols to retrieve the original signals. The resulting effect is a nulling of the added phase rotations or offsets in the transmitted signals. In another embodiment of the receiver 300, a frequency domain equalizer is used instead of the complement Newman block 325. The equalizer is initially trained using a signal rotated by the same Newman rotor sequence as the transmitted data. The equalizer tap values are then used instead of multiplying the sequence of signals by the complement Newman rotors.

To reduce out of band signaling or other additional signaling that would result in an increased overhead between the transmitter 200 and the receiver 300, system wide pre-computed rotors may be stored in the transmitter 200 (e.g., at a UE) and receiver 300 (e.g., at an eNB). Aligning the application of the NRS with the bandwidth allocation allows easy alignment at the receiver 300 for each repeated sequence of Newman rotors (e.g., for each sequence of length N). Alternatively, the rotors and complement rotors are generated at the transmitter 200 and receiver 300, respectively, using the same formulation described above.

Figure 4:
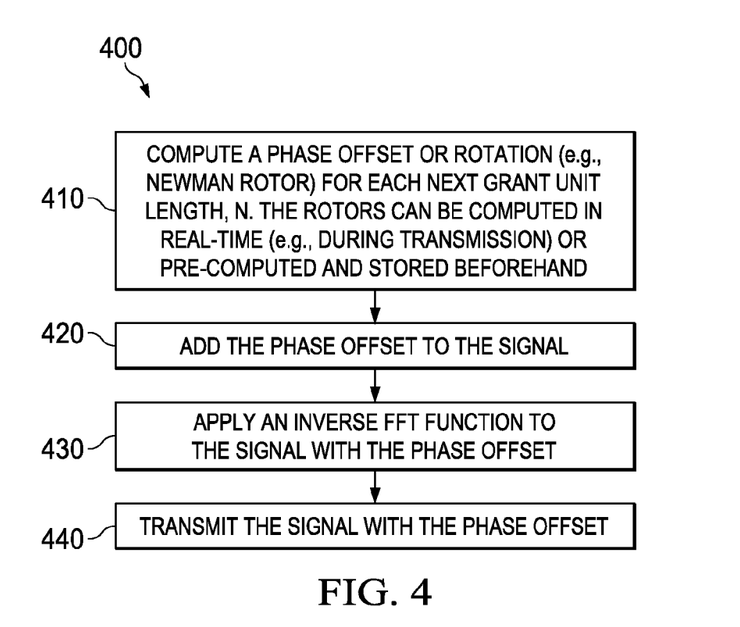
FIG. 4 is a flow diagram for an embodiment method to transmit MC-CDMA signals with limited or suppressed PAPR.

FIG. 4 is a flow diagram for an embodiment method 400 to transmit, in MC-CDMA or derivatives systems, signals with limited or suppressed PAPR. The method 400 can be implemented by a transmitter, such as the transmitter 200 that can be implemented in a UE, another terminal device, or in network infrastructure as well as in other devices as will be understood by those skilled in the art. At step 410, a Newman rotor sequence of a determined minimum grant bandwidth length (Gmin). The rotors can be computed in real-time (e.g., during transmission) or pre-computed and stored beforehand. At step 420, the Newman rotor sequence is added to a corresponding sequence of symbols. At step 430, an inverse FFT function is applied to the resulting sequence of symbols (with added Newman phase sequence). At step 440, the signal is transmitted (e.g., to an eNB). The method then returns to re-implementing the steps above to apply the same Newman rotor sequence to the next sequence of N transmitted symbols. Other steps for processing the signal before transmission can also be implemented, for example according to the sequence of functional blocks of the transmitter 200.

Figure 5:
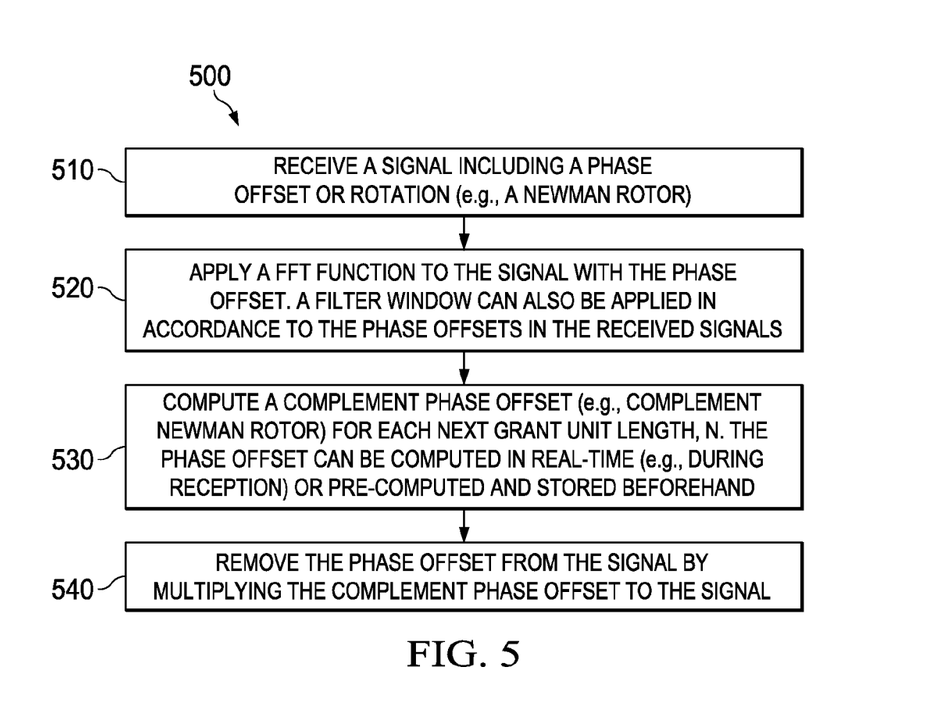
FIG. 5 is a flow diagram for an embodiment method to receive MC-CDMA signals with limited or suppressed PAPR.

FIG. 5 is a flow diagram for an embodiment method 500 to receive the MC-CDMA or similar signals provided by the method 400. The method 500 can be implemented by a receiver or a base station, such as the receiver 300. At step 510, a sequence of symbols is received (e.g., from a UE). The symbols include a corresponding sequence of Newman rotors (of Gmin or RE length). At step 520, a FFT function is applied to the sequence of symbols with the Newman rotor sequence. At step 530, the Newman rotors are removed from the received symbols sequence. This may be achieved by multiplying the symbols with corresponding complement Newman rotors or using a properly trained equalizer, as described above. The complement Newman rotor sequence can be computed in real-time (e.g., during reception) or pre-computed and stored beforehand. In case of computing the complement Newman rotors, both the receiver and the transmitter have at least knowledge of N in order to align the sequences at the receiver with the transmitter. Other steps for processing the received signal can also be implemented, for example according to the sequence of functional blocks of the receiver 300.

Figure 6:
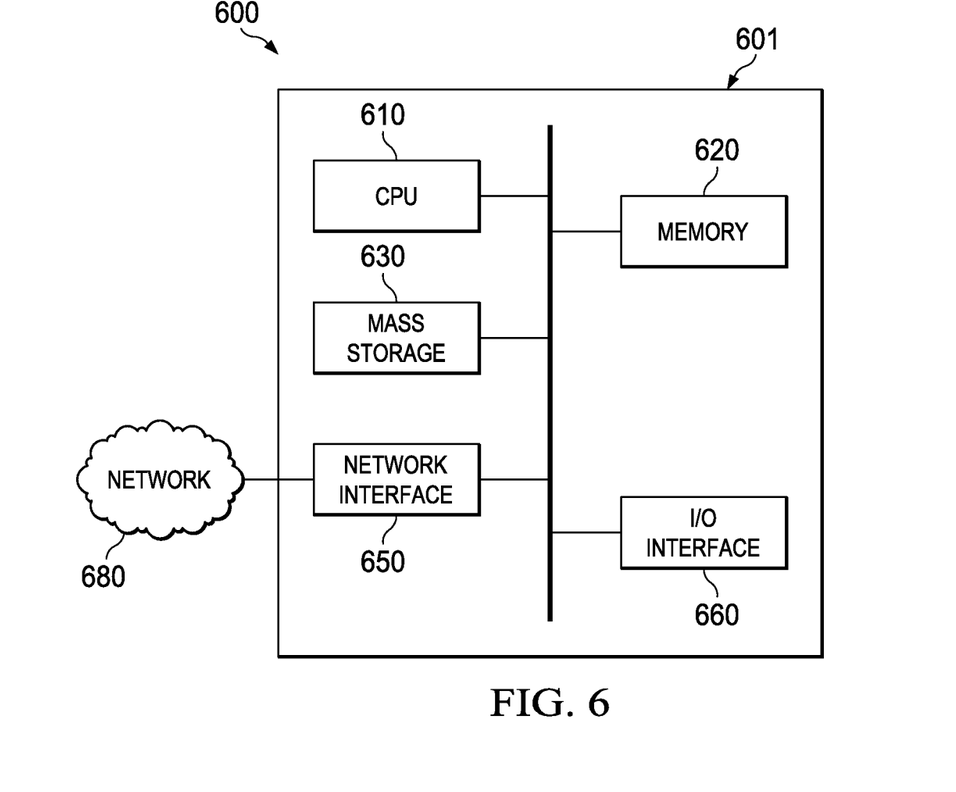
FIG. 6 is a diagram of a processing system that can be used to implement various embodiments.

FIG. 6 is a block diagram of an exemplary processing system 600 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 600 may comprise a processing unit 601 equipped with one or more input/output devices, such as a network interface, storage interface, and the like. The processing unit 601 may include a central processing unit (CPU) 610, a memory 620, a mass storage device 630, and an I/O interface 660 connected to a bus. The bus may be one or more of any type of several bus architectures including a memory bus or memory controller, a peripheral bus or the like.

The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. The mass storage device 630 may comprise any type of storage device configured to store data, programs, and other information and to make the data, programs, and other information accessible via the bus. The mass storage device 630 may comprise, for example, one or more of a solid state drive, hard disk drive, a magnetic disk drive, an optical disk drive, or the like.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a transmitter for suppressing peak-to-average-power ratio (PAPR) in Multi-Carrier Code Division Multiple Access (MC-CDMA) and derivative systems, the method comprising:
    generating, at the transmitter, a plurality of signals encoded and modulated according to MC-CDMA;
    adding, to a sequence of the signals, a corresponding sequence of Newman phase offsets, wherein each of the signals is added a corresponding phase offset of the Newman phase offsets;
    generating a converted sequence of signals by applying an inverse Fourier transform to the sequence of signals after adding the sequence of Newman phase offsets to the sequence of signals;
    applying serial to parallel signal conversion to the sequence of signals after adding the sequence of Newman phase offsets and prior to applying the inverse Fourier transform; and
    transmitting the converted sequence of signals including the sequence of Newman phase offsets.

2. The method of claim 1, wherein the sequence of Newman phase offsets comprises a product of a sequence of integers and a value of pi, the product raised to a power of two and divided by a total number of phase offsets in the added sequence of Newman phase offsets.

3. The method of claim 2, wherein the sequence of integers is monotonically increased or decreased by one, and wherein a first integer in the sequence of integers is 0.

4. The method of claim 1 further comprising adding, to the sequence of signals, a same constant phase offset with each of the Newman phase offsets.

5. The method of claim 1, wherein adding the sequence of Newman phase offsets to the sequence of signals comprises:
    calculating a sequence of Newman rotors as an exponential function of the sequence of Newman phase offsets; and
    multiplying the sequence of signals by the sequence of Newman rotors.

6. The method of claim 1, wherein the sequence of Newman phase offsets or Newman rotors is pre-calculated or stored at the transmitter without exchanging the sequence of Newman phase offsets or Newman rotors with a receiver of the signals.

7. The method of claim 1 further comprising:
    adding the same sequence of Newman phase offsets to a second sequence of signals subsequent to the sequence of signals;
    applying an inverse Fourier transform to the second sequence of signals; and
    transmitting the second sequence of signals including the sequence of Newman phase offsets after transmitting the converted sequence of signals.

8. The method of claim 1, wherein the sequence of Newman phase offsets comprises an integer number of Newman phase offsets, and wherein a total length of the sequence of Newman phase offsets is equal to a defined minimum grant bandwidth or a fraction of the defined minimum grant bandwidth.

9. The method of claim 8 further comprising selecting the minimum grant bandwidth in accordance to a bandwidth allocated for transmission per user, wherein the bandwidth allocated per user is an integer multiple of the minimum grant bandwidth.

10. The method of claim 8, wherein the minimum grant bandwidth is equal in length to an integer number of allocated resource elements (REs).

11. The method of claim 8, wherein the minimum grant bandwidth is equal to the bandwidth allocated per user.

12. The method of claim 8 further comprising selecting the minimum grant bandwidth, in accordance with the bandwidth allocated per user and a spreading factor in signals of the MC-CDMA or derivative systems, to set the transmitted sequence of signals at a PAPR level less than or about equal to an average PAPR level of an orthogonal frequency-division multiplexing (OFDM) having an equivalent number of subcarriers to the transmitted signals.

13. The method of claim 1, wherein the sequence of signals is a sequence of symbols for MC-CDMA or derivative systems.

14. A transmitter configured for suppressing peak-to-average-power ratio (PAPR) in Multi-Carrier Code Division Multiple Access (MC-CDMA) and derivative systems, the transmitter comprising:
at least one processor; and
a non-transitory computer readable storage medium storing programming for execution by the at least one processor, the programming including instructions to:
generate a plurality of symbols encoded and modulated according to MC-CDMA;
add, to a sequence of the symbols, a corresponding sequence of Newman phase offsets, wherein each of the symbols is added a corresponding phase offset of the Newman phase offsets;
generate a converted sequence of signals by apply an inverse Fourier transform to the sequence of symbols after adding the sequence of Newman phase offsets to the sequence of symbols;
apply serial to parallel signal conversion to the sequence of symbols after adding the sequence of Newman phase offsets and prior to applying the inverse Fourier transform; and
send the converted sequence of symbols including the sequence of Newman phase offsets.

15. The transmitter of claim 14, wherein the programming includes further instructions to:
modulate each of the symbols;
apply symbol spreading to the symbols prior to adding the Newman phase offsets; and
insert a cyclic prefix (CP) to the converted sequence of symbols after applying the inverse Fourier transform and prior to transmission.

16. The transmitter of claim 14, wherein the transmitted symbols are MC-CDMA symbols, Low Density Signature OFDM (LDS-OFDM) symbols, or other MC-CDMA derivative symbols.

17. The transmitter of claim 14, wherein the transmitter is a component in a user equipment.

18. A method by a receiver for receiving signals with suppressed peak-to-average-power ratio (PAPR) in Multi-Carrier Code Division Multiple Access (MC-CDMA) and derivative systems, the method comprising:
receiving, at the receiver from a communication device, a sequence of signals comprising a corresponding sequence of Newman phase offsets, wherein the received sequence of signals is encoded and modulated according to MC-CDMA;
applying a Fourier transform to the sequence of signals;
removing the sequence of Newman phase offsets from the sequence of signals to obtain a converted sequence of signals, wherein the sequence of Newman phase offsets is removed from the sequence of signals using, in the receiver, equalizer tap values trained on a signal containing the sequence of Newman phase offsets; and
decoding the converted sequence of signals without the sequence of Newman phase offsets to retrieve information from the communication device.

19. The method of claim 18, wherein the signals have a PAPR level less than or about equal to an average PAPR level of an orthogonal frequency division multiplexing (OFDM) signal having an equivalent number of subcarriers to the received signals.

20. The method of claim 18, wherein removing the sequence of Newman phase offsets from the sequence of signals comprises:
calculating a complement sequence of Newman rotors as a complement complex exponential function of the sequence of Newman phase offsets; and
multiplying the sequence of signals by the complement sequence of Newman rotors.

21. The method of claim 18 further comprising:
receiving, from the communication device after the sequence of signals, a second sequence of signals comprising the same sequence of Newman phase offsets, wherein the second sequence of signals have a PAPR level less than or about equal to that of an orthogonal frequency-division multiplexing (OFDM) signal;
applying a Fourier transform to the second sequence of signals; and
removing the sequence of Newman phase offsets from the second sequence of signals.

22. The method of claim 18 further comprising:
receiving, from a second communication device, a second sequence of signals comprising the same sequence of Newman phase offsets, wherein the second sequence of signals have a PAPR level of an OFDM signal;
applying a Fourier transform to the second sequence of signals; and
removing the sequence of Newman phase offsets from the second sequence of signals.

23. The method of claim 22, wherein the communication device and the second communication device are allocated equal, different, or overlapping bandwidths for transmission, and wherein the bandwidths each comprise one or more repeated sequence of Newman phase offsets.

24. The method of claim 18 further comprising:
receiving, from a second communication device, a second sequence of signals comprising a second sequence of Newman phase offsets equal in length to the sequence of Newman phase offsets in the sequence of signals from the communication device, wherein the second sequence of signals have a PAPR level of an OFDM signal;
applying a Fourier transform to the second sequence of signals; and
removing the second sequence of Newman phase offsets from the second sequence of signals.

25. The method of claim 24, wherein the communication device and the second communication device are allocated equal bandwidths for transmission, and wherein the bandwidths each comprise one or more repeated sequence of Newman phase offsets.

26. The method of claim 18, wherein the sequence of Newman phase offsets is pre-calculated or stored at the receiver without exchanging the sequence of Newman phase offsets with a transmitter of the signals.

27. A receiver configured for receiving signals with suppressed peak-to-average-power ratio (PAPR) in Multi-Carrier Code Division Multiple Access (MC-CDMA) and derivative systems, the receiver comprising:
at least one processor; and
a non-transitory computer readable storage medium storing programming for execution by the at least one processor, the programming including instructions to:
receive, from a communication device, a sequence of signals comprising a corresponding sequence of Newman phase offsets, wherein the received sequence of signals is encoded and modulated according to MC-CDMA
apply a Fourier transform to a sequence of symbols comprising a corresponding sequence of Newman phase offsets, wherein the sequence of symbols is received from a communication device;
remove the sequence of Newman phase offsets from the sequence of symbols to obtain a converted sequence of signals, wherein the sequence of Newman phase offsets is removed from the sequence of signals using, in the receiver, equalizer tap values trained on a signal containing the sequence of Newman phase offsets; and
decode the converted sequence of signals without the sequence of Newman phase offsets to retrieve information from the communication device.

28. The receiver of claim 27, wherein the programming includes further instructions to:
remove a cyclic prefix (CP) in the received symbols prior to applying the Fourier transform and a windowing function;
apply parallel to serial signal conversion to the symbols after applying the Fourier transform and the windowing function and prior to removing the sequence of Newman phase offsets from the symbols; and
apply signal recovery and decoding after removing the sequence of Newman phase offsets from the symbols.

29. The receiver of claim 27, wherein the received symbols are MC-CDMA symbols, Low Density Signature OFDM (LDS-OFDM) symbols, or other MC-CDMA derivative symbols.

30. The receiver of claim 27, wherein the receiver is a component in a user equipment.

* * * * *